United States Patent
Jin

(10) Patent No.: US 11,208,004 B2
(45) Date of Patent: Dec. 28, 2021

(54) MODEL PREDICTIVE BATTERY POWER LIMIT ESTIMATION SYSTEMS AND METHODS

(71) Applicant: CPS Technology Holdings LLC, New York, NY (US)

(72) Inventor: Zhihong H. Jin, Pewaukee, WI (US)

(73) Assignee: CPS Technology Holdings, New York, NY (US)

( * ) Notice: Subject to any disclaimer, the term of this patent is extended or adjusted under 35 U.S.C. 154(b) by 421 days.

(21) Appl. No.: 16/346,042

(22) PCT Filed: Oct. 31, 2017

(86) PCT No.: PCT/US2017/059380
§ 371 (c)(1),
(2) Date: Apr. 29, 2019

(87) PCT Pub. No.: WO2018/081818
PCT Pub. Date: May 3, 2018

(65) Prior Publication Data
US 2019/0248252 A1 Aug. 15, 2019

Related U.S. Application Data

(60) Provisional application No. 62/415,280, filed on Oct. 31, 2016.

(51) Int. Cl.
*B60L 58/00* (2019.01)
*B60W 20/00* (2016.01)
(Continued)

(52) U.S. Cl.
CPC .............. *B60L 58/12* (2019.02); *B60L 50/60* (2019.02); *B60L 58/15* (2019.02); *B60L 58/16* (2019.02);
(Continued)

(58) Field of Classification Search
None
See application file for complete search history.

(56) References Cited

U.S. PATENT DOCUMENTS 9,056,556 B1* 6/2015 Hyde ...................... B60L 58/10
2005/0077867 A1* 4/2005 Cawthorne ............ B60K 6/445
320/104
(Continued)

FOREIGN PATENT DOCUMENTS

JP 2006340560 A * 12/2006
JP 2006340560 A1 12/2006

OTHER PUBLICATIONS

Plett, Gregory L., "Battery Management System Algorithms for HEV Battery State-of-Charge and State-of-Health Estimation," Advanced Materials and Methods for Lithium-Ion Batteries, 2007, pp. 1-25.
(Continued)

*Primary Examiner* — Todd Melton
*Assistant Examiner* — Jason R Roberson
(74) *Attorney, Agent, or Firm* — Boardman & Clark LLP

(57) ABSTRACT

Systems and methods for improving operation of an automotive battery system including an automotive electrical system comprising a battery system that uses operational parameters, predicted internal resistance of a battery expected over a prediction horizon, and real-time internal resistance of a battery to increase performance and reliability. The battery system includes a battery electrically coupled to electrical devices in the automotive system, sensors coupled to the battery that determine terminal voltage of battery, and a battery control system communicatively coupled to sensors. The battery control system determines a charging power limit used to control supply of electrical power to the battery when charging the battery, based on predicted internal resistance when measured terminal volt-
(Continued)

age of the battery is not greater than a lower voltage threshold and based on a real-time internal resistance of the battery when the measured terminal voltage of the battery is greater than the lower voltage threshold.

20 Claims, 4 Drawing Sheets

(51) Int. Cl.
*B60L 58/12* (2019.01)
*B60L 58/16* (2019.01)
*B60L 58/15* (2019.01)
*B60L 50/60* (2019.01)
*G06N 5/02* (2006.01)

(52) U.S. Cl.
CPC .......... *G06N 5/02* (2013.01); *B60L 2240/545* (2013.01); *B60L 2240/547* (2013.01); *B60L 2240/549* (2013.01); *B60L 2260/44* (2013.01); *B60L 2260/50* (2013.01); *Y02T 10/70* (2013.01); *Y02T 90/16* (2013.01)

(56) References Cited

U.S. PATENT DOCUMENTS

| | | | |
|---|---|---|---|
| 2009/0058366 A1* | 3/2009 | Masuda | B60W 10/28 320/135 |
| 2014/0183938 A1 | 7/2014 | Peswani | |
| 2015/0177331 A1 | 6/2015 | Nakayama et al. | |
| 2015/0258907 A1 | 9/2015 | Lee | |

OTHER PUBLICATIONS

Albertus, Paul, et al., "A Simplified Model for Determining Capacity Usage and Battery Size for Hybrid and Plug-In Hybrid Electric Vehicles," Journal of Power Sources, 183, May 7, 2008, pp. 376-380.
Subramanian, Venkat R., et al., "Mathematical Model Reformulation for Lithium-Ion Battery Simulations Galvanostatic Boundary Conditions," Journal of the Electrochemical Society, 156 (4), Jan. 30, 2009, pp. A260-A270.
Van Bree, Patrick J., et al., "Prediction of Battery Behavior Subject to High-Rate Partial State of Charge," IEEE Transactions of Vehicular Technology, vol. 58, No. 2, Feb. 17, 2009, pp. 588-595.
Sampathnarayanan, Balaji, et al., "Model Predictive Control as an Energy Management Strategy for Hybrid Electric Vehicles," Proceedings of the ASME 2009 Dynamic Systems and Control Conference, Oct. 12-14, 2009, Hollywood, California, USA, pp. 1-8, downloaded from http://proceedings.asmedigitalcollection.asme.org on Apr. 29, 2019.
Idaho National Laboratory, "Battery Test Manual for Plug-In Hybrid Electric Vehicles," U.S. Department of Energy Vehicle Technologies Program, Revision 1, Sep. 2010, pp. 1-70.

Wu, Shao-Ling, et al., "High Rate Capability of Li(Ni1/3Mn1/3Co1/3)O2 Electrode for Li-Ion Batteries," Journal of the Electrochemical Society, 159 (4), Jan. 31, 2012, pages A438-A444.
Wang, Shuoqin, et al., "Power Prediction from a Battery State Estimator that Incorporates Diffusion Resistance," Journal of Power Sources, 214, Apr. 30, 2012, pp. 399-406.
Xiong, Rui, et al., "Online Estimation of Peak Power Capability of Li-Ion Batteries in Electric Vehicles by a Hardware-in-Loop Approach," Energies, 5, May 15, 2012, pp. 1455-1469.
Xiong, Rui, et al., "Model-Based State of Charge and Peak Power Capability Joint Estimation of Lithium-Ion Battery in Plug-In Hybrid Electric Vehicles," Journal of Power Sources, 229, Dec. 10, 2012, pp. 159-169.
Suthar, Bharatkumar, et al., "Optimal Control and State Estimation of Lithium-Ion Batteries using Reformulated Models," 2013 American Control Conference (ACC), Washington, DC, USA, Jun. 17-19, 2013, pp. 5350-5355.
Fleischer, Christian, et al., "On-Line Adaptive Battery Impedance Parameter and State Estimation Considering Physical Principles in Reduced Order Equivalent Circuit Battery Models," Journal of Power Sources, 260, Mar. 5, 2014, pp. 276-291.
Sun, Fengchun, et al., "Estimation of State-of-Charge and State-of-Power Capability of Lithium-Ion Battery Considering Varying Health Conditions," Journal of Power Sources, 259, Mar. 6, 2014, pp. 166-176.
Waag, Wladislaw, et al., "Critical Review of the Methods for Monitoring of Lithium-Ion Batteries in Electric and Hybrid Vehicles," Journal of Power Sources 258, Mar. 7, 2014, pp. 321-339.
Fleischer, Christian, et al., "On-Line Adaptive Battery Impedance Parameter and State Estimation Considering Physical Principles in Reduced Order Equivalent Circuit Battery Models: Part 2. Parameter and State Estimation," Journal of Power Sources, 262, Mar. 27, 2014, pp. 457-482.
Di Cairano, Stefano, et al., "Stochastic MPC with Learning for Driver-Predictive Vehicle Control and its Application to HEV Energy Management," IEEE Transactions on Control Systems Technology, vol. 22, No. 3, May 2014, pp. 1018-1031.
Zou, Yuan, et al., "Combined State of Charge and State of Health Estimation Over Lithium-Ion Battery Cell Cycle Lifespan for Electric Vehicles," Journal of Power Sources, 273, Oct. 2, 2014, pp. 793-803.
Feng, Tianheng, et al., "Online Identification of Lithium-Ion Battery Parameters Based on an Improved Equivalent-Circuit Model and its Implementation on Battery State-of-Power Prediction," Journal of Power Sources, 281, Jan. 30, 2015, pp. 192-203.
Xavier, Marcelo A., et al., "Lithium-Ion Battery Cell-Level Control Using Constrained Model Predictive Control and Equivalent Circuit Models," Journal of Power Sources, 285, Mar. 13, 2015, pp. 374-384.
Jin, Zhihong, et al., "Estimating the Power Limit of a Lithium Battery Pack by Considering Cell Variability," SAE International, Apr. 14, 2015, pp. 1-10.
Fridholm, Björn, et al., "Robust Recursive Impedance Estimation for Automotive Lithium-Ion Batteries," Journal of Power Sources, 304, Nov. 21, 2015, pp. 33-41.
International Search Report and Written Opinion for PCT/US2017/059380, dated Feb. 1, 2018, pp. 1-33.

* cited by examiner

MODEL PREDICTIVE BATTERY POWER LIMIT ESTIMATION SYSTEMS AND METHODS

CROSS REFERENCE TO RELATED APPLICATIONS

This application is a U.S. National Stage Application under 35 U.S.C. § 371 of International Application No. PCT/US17/59380, entitled "MODEL PREDICTIVE BATTERY POWER LIMIT ESTIMATION SYSTEMS AND METHODS," filed Oct. 31, 2017, which claims priority to and the benefit of U.S. Provisional Application No. 62/415,280, entitled "INTEGRATING FEEDBACK CONTROL ALGORITHMS WITH A LITHIUM-ION BATTERY MODEL FOR REAL TIME POWER LIMIT ESTIMATION," filed Oct. 31, 2016, which are each incorporated herein by reference in their entireties for all purposes.

BACKGROUND

The present disclosure generally relates to battery systems and, more specifically, to battery control systems utilized in battery systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electrical systems often include a battery system to capture (e.g., store) generated electrical energy and/or to supply electrical power. In fact, battery systems may be included in electrical systems utilized for various applications. For example, a stationary power system may include a battery system that receives electrical power output by an electrical generator and stores the electrical power as electrical energy. In this manner, the battery system may supply electrical power to electrical loads using the stored electrical energy.

Additionally, an electrical system in an automotive vehicle may include a battery system that supplies electrical power, for example, to provide and/or supplement the motive force (e.g., power) of the automotive vehicle. For the purpose of the present disclosure, such automotive vehicles are referred to as xEV and may include any one, any variation, and/or any combination of the following type of automotive vehicles. For example, electric vehicles (EVs) may utilize a battery-powered electric propulsion system (e.g., one or more electric motors) as the primary source of vehicular motive force. As such, a battery system in an electric vehicle may be implemented to supply electrical power to the battery-powered electric propulsion system. Additionally, hybrid electric vehicles (HEVs) may utilize a combination of a battery-powered electric propulsion system and an internal combustion engine propulsion system to produce vehicular motive force. As such, a battery system may be implemented to facilitate directly providing at least a portion of the vehicular motive force by supplying electrical power to the battery-powered electric propulsion system.

Micro-hybrid electric vehicles (mHEVs) may use an internal combustion engine propulsion system as the primary source of vehicular motive force, but may utilize the battery system to implement "Stop-Start" techniques. In particular, a mHEV may disable its internal combustion engine while idling and crank (e.g., restart) the internal combustion engine when propulsion is subsequently desired. To facilitate implementing such techniques, the battery system may continue supplying electrical power while the internal combustion engine is disabled and supply electrical power to crank the internal combustion engine. In this manner, the battery system may indirectly supplement providing the vehicular motive force.

To facilitate controlling its operation, a battery system often includes a battery control system, for example, that determines a battery state, such as state-of-function (SoF), state-of-health (SoH), and/or state-of-charge (SoC). In some instances, charging and/or discharging of a battery (e.g., battery module, battery pack, or battery cell) may be controlled based at least in part on a corresponding battery state determined by the battery control system. For example, magnitude of current and/or voltage supplied to charge the battery may be controlled based at least in part on a charging power limit indicated by its corresponding state-of-function. Thus, at least in some instances, accuracy of a battery state determination by a battery control system may affect operational stability and/or operational efficiency of its corresponding battery system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an automotive electrical system includes a battery system that includes a battery configured to be electrically coupled to one or more electrical devices in the automotive electrical system, one or more sensors electrically coupled to the terminals of the battery, and a battery control system communicatively coupled to the one or more sensors measuring terminal voltage of the battery. The battery control system is programmed to determine a predicted internal resistance of the battery, where the predicted internal resistance based on projected operational conditions (state-of-charge, temperature, power usage, etc.). The battery control system also determines a charging power limit used to control supply of electrical power to the battery based on the predicted internal resistance when the measured terminal voltage of the battery is not greater than a lower voltage threshold. When the measured terminal voltage of the battery is greater than the lower voltage threshold, the battery control system determines a real-time internal resistance of the battery based on the measured terminal voltage of the battery and a battery model that describes a relationship between measured battery parameters and internal resistance of the battery, and determines the charging power limit based on the real-time internal resistance to facilitate improving operational reliability of the battery.

In a second embodiment, a method for controlling charging of a battery cell in an automotive vehicle includes determining, using a control system, measured terminal voltage of the battery cell based on sensor data, a predicted internal resistance of the battery cell, and a charging power limit. The predicted internal resistance based on projected operational conditions (state-of-charge, temperature, power usage, etc.). When the measured terminal voltage of the battery cell is not greater than a lower voltage threshold, the charging power limit is based on the predicted internal resistance of the battery cell. When the measured terminal voltage of the battery cell is greater than the lower voltage threshold, the charging power limit is based on a real-time internal resistance of the battery cell, where the real-time internal resistance of the battery cell is determined based on a battery model that relates measured operational parameters to model parameters comprising internal resistance. The control system instructs an electrical power source to adjust charging power supplied to the battery cell based on the charging power limit when a target charging power is greater than the charging power limit.

In a third embodiment, a tangible, non-transitory, computer-readable medium stores instructions executable by one or more processors of an automotive control system. The instructions include determining, using the one or more processors, measured terminal voltage of an automotive battery module based on sensor data, a predicted internal resistance of the automotive battery module expected to occur over a prediction horizon, a charging current limit, and instruct the automotive battery to supply electrical power to an electrical device in an automotive vehicle based on the discharging current limit. The discharging charging current limit is based on the predicted internal resistance of the automotive battery module when the measured terminal voltage of the automotive battery module is not greater than a lower voltage threshold. When the measured terminal voltage of the automotive battery module is greater than the lower voltage threshold, the discharging limit is based on a real-time internal resistance of the automotive battery module. The real-time internal resistance of the automotive battery module is determined by a battery model that relates measured battery parameters to model parameters comprising internal resistance.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
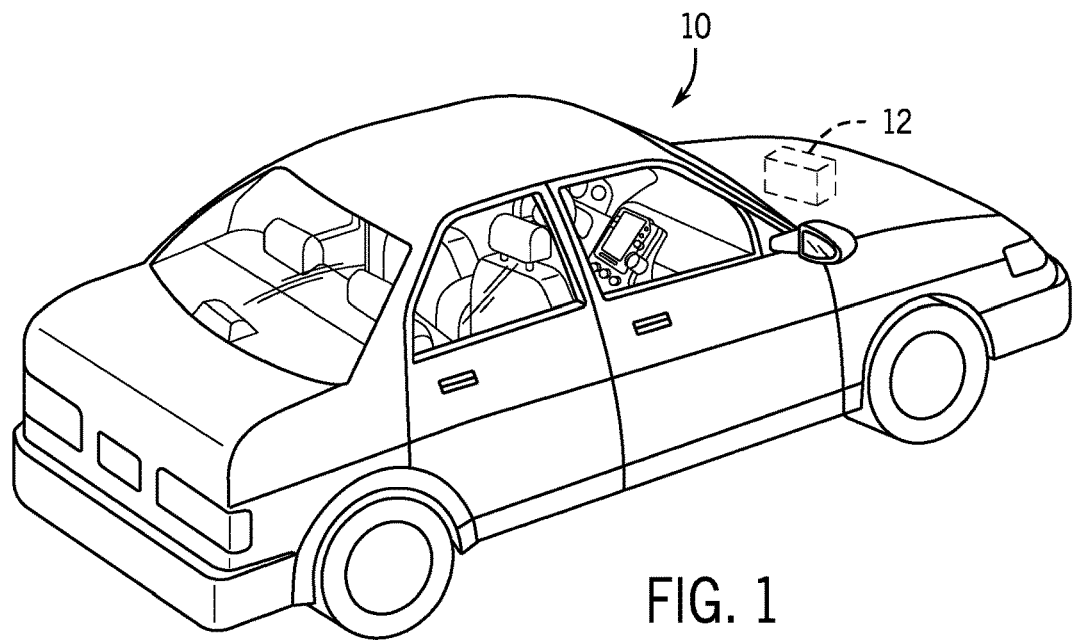
FIG. 1 is a perspective view of an automotive vehicle including a battery system, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, a battery system may be implemented to capture (e.g., store) electrical energy generated by one or more electrical generators and/or to supply electrical power to one or more electrical loads using stored electrical energy. Leveraging these benefits, one or more battery systems are often included in an electrical system. In fact, battery systems may be utilized in electrical systems implemented for a wide-variety of target applications, for example, ranging from stationary power systems to vehicular (e.g., automotive) electrical systems.

In any case, to facilitate controlling its operation (e.g., charging and/or discharging), a battery system often includes a battery control system. In some instances, charging and/or discharging of a battery (e.g., battery module, battery pack, or battery cell) in the battery system may be controlled based at least in part on corresponding battery states, for example, by a higher-level (e.g., vehicle) control system in coordination with the battery control system. Thus, to facilitate controlling operation of the battery system, its battery control system may determine battery states by executing control applications based at least in part on operational parameters (e.g., voltage, current, and/or temperature) of the battery.

For example, based at least in part on current flow through the battery, the battery control system may execute a state-of-charge (SoC) application to determine (e.g., predict or estimate) open-circuit voltage (OCV) of the battery. Additionally or alternatively, based at least in part on current and/or voltage of a battery, the battery control system may execute a state-of-health (SoH) application to determine internal resistance of the battery. Additionally or alternatively, based at least in part on temperature and/or internal resistance of a battery, the battery control system may execute a state-of-function (SoF) application to determine a power (e.g., voltage and/or current) limit for charging and/or discharging the battery.

Based at least in part on battery state, in some instances, a battery control system may directly control operation of a corresponding battery system by outputting control commands (e.g., signals) that instruct the battery system to perform one or more control actions. For example, the battery control system may output a control command that instructs a switching device electrically coupled between a battery in the battery system and an electrical generator (e.g., alternator) to switch from a closed (e.g., electrically connected) position to an open (e.g., electrically disconnected) position when state-of-charge of the battery exceeds a state-of-charge threshold. Additionally or alternatively, a battery control system may facilitate controlling operation of a corresponding battery system by communicating battery state data to a higher-level control system, which is implemented to control operation of one or more devices (e.g., equipment or machines) external from the battery system. For example, based at least in part on data indicative of battery state-of-function, a vehicle control unit may output a control command that instructs an alternator to adjust current and/or voltage of electrical power output to the battery system.

To facilitate improving operation of a battery system, in some instances, its battery control system may predict (e.g., estimate) battery states based at least in part on operational parameters determined via a battery (e.g., pack or cell) model, for example, to facilitate selecting between candidate control strategies (e.g., actions). In other words, the battery control system may determine modeled (e.g., predicted) operational parameters of the battery system based at least in part on the battery model. Additionally or alternatively, the battery control system may determine measured (e.g., real-time) operational parameters of the battery system based at least in part on sensor data received from one or more sensors.

Thus, at least in some instances, operation of a battery system may be controlled in different manners in response to different battery states and/or different operational parameters. As such, when operation of a battery system is controlled based on a predicted battery state determined by its battery control system, accuracy of the predicted battery state relative to a corresponding real-time battery state and/or accuracy of a modeled operational parameter relative to a measured operational parameter may affect operational reliability and/or operational efficiency of the battery system. For example, when greater than an actual charge power limit, supplying electrical power to a battery in accordance with a determined charge power limit may decrease subsequent lifespan and, thus, reliability of the battery. Additionally or alternatively, when less than an actual state-of-charge, disconnecting electrical power used to charge a battery based on a determined state-of-charge may decrease amount of captured electrical energy and, thus, operational efficiency of the battery system.

In some instances, modeled operational parameters of a battery system may differ from measured operational parameters, for example, due to inaccuracies in the battery model. Thus, a predicted (e.g., modeled) battery state determined based on the modeled operational parameters may also differ from a real-time (e.g., measured) battery state determined based on the measured operational parameters. Moreover, in some instances, the modeled battery state and the measured battery state may differ due to inaccuracies in a corresponding control application. At least in some instances, controlling operation when such discrepancies occur may affect operational reliability and/or operational efficiency of a battery system, for example, by resulting in a battery module being electrically disconnected before being charged up to the state-of-charge threshold, thereby limiting energy storage provided by the battery system and/or ability of the battery system to subsequently crank an internal combustion engine.

Accordingly, the present disclosure provides techniques to facilitate improving operation of a battery system, for example, by improving accuracy of online (e.g., real-time or near real-time) battery state determination. To facilitate online battery state determination, a battery control system may receive sensor data indicative of operational parameters of a battery (e.g., battery module or battery cell) implemented in the battery system. For example, during operation of the battery system, the battery control system may receive sensor data indicative of temperature of a battery module, current flow through the battery module, terminal voltage of the battery module, and/or voltage across one or more battery cells in the battery module.

In some embodiments, lifespan of a battery may be improved by maintaining terminal voltage of the battery below an upper (e.g., maximum) voltage threshold. To reduce likelihood of sensor (e.g., measurement) error resulting in terminal voltage exceeding the upper voltage threshold, in some embodiments, a battery control system may begin de-rating the battery system before terminal voltage of the battery reaches the upper voltage threshold. For example, the battery control system may limit current and, thus, charging power supplied to the battery based at least in part on relationship (e.g., difference) between the terminal voltage and a lower voltage threshold.

In some embodiments, a battery control system may determine a power limit for charging and/or discharging a battery based at least in part on internal resistance of the battery. Generally, internal resistance of a battery is dynamic during operation and over the course of its life span. For example, the internal resistance a lithium-ion battery may increase as the battery ages. Additionally, the internal resistance of a lithium-ion battery may be inversely related to its temperature. Furthermore, the internal resistance of a lithium-ion battery may pulse (e.g., spike) during operation, for example, when the lithium ion battery is charged during regenerative braking or discharged during a start-stop operation.

To facilitate accounting for the dynamic nature, in some embodiments, a battery control system may predict internal resistance of a battery over a prediction horizon (e.g., period of time) based on projected operational conditions (state-of-charge, temperature, power usage, etc.). Generally, controlling charging and/or discharging of a battery in accordance with a power limit determined based at least in part on its predicted internal resistance may be sufficient to maintain voltage of the battery below the upper voltage threshold. However, in some instances (e.g., corner cases), controlling operation of the battery in this manner may affect operational efficiency of the battery system, for example, due to difference between the predicted internal resistance and actual internal resistance of the battery resulting in battery voltage rapidly oscillating if control algorithm is not properly designed. In fact, when implemented in an automotive vehicle, such battery voltage oscillations may affect drivability, for example, by causing lurches in movement of the automotive vehicle.

To facilitate reducing likelihood of producing rapid battery voltage oscillations, in some embodiments, a battery control system may determine a real-time (e.g., instantaneous) internal resistance based at least in part on presently determined (e.g., measured) operational parameters. For example, using a battery model, the battery control system may determine the real-time internal resistance of a battery based at least in part on presently determined current and terminal voltage of the battery. Since determined based on presently determined operational parameters, at least in some instances, the real-time internal resistance may more accurately represent the actual internal battery resistance at a specific point in time, for example, compared to a predicted internal resistance that is averaged over a longer period of time.

Nevertheless, to facilitate improving processing latency, a battery control system may generally determine power limits based on predicted internal resistance, but determine the power limits based on real-time internal resistance when charging and/or discharging based on the predicted internal resistance is expected to result in rapid battery voltage oscillations. In some embodiments, a battery control system may determine likelihood of producing rapid battery voltage oscillations based at least in part on terminal voltage of the battery. For example, when terminal voltage is greater than the lower voltage threshold, the battery control system may determine that controlling charging using a charging power limit determined based on the predicted internal resistance is expected to result in rapid battery voltage oscillations and thus, determine the charging power limit based on the real-time internal resistance.

By determining charging and/or discharging power limits in this manner, a battery control system may improve accuracy of its state-of-function determination. In a similar manner, the battery control system may additionally or alternatively improve accuracy of other battery state determinations. As described above, at least in some instances, improving accuracy of battery states determined by a battery control system and used to control operation of a corresponding battery system facilitate improving operational reliability and/or operational efficiency of a battery system and, thus, an electrical system in which the battery system is implemented.

To help illustrate, an automotive vehicle 10 with an electrical system, which includes a battery system 12, is shown in FIG. 1. Discussion with regard to the automotive vehicle 10 is merely intended to help illustrate the techniques of the present disclosure and not to limit scope of the techniques. The automotive vehicle 10 may include the battery system 12 and an automotive electrical system that controls a vehicle console, an electric motor, and/or a generator. In some cases, the battery system 12 may include some or all of the automotive electrical system. For sake of discussion, the battery system 12 is electrically coupled to components in the automotive electrical system discussed. In some embodiments, the automotive vehicle 10 may be an xEV, which utilizes the battery system 12 to provide and/or supplement vehicular motive force, for example, used to accelerate and/or decelerate the automotive vehicle 10. In other embodiments, the automotive vehicle 10 may be a automotive vehicle 10 that produces vehicular motive force, for example, using an internal combustion engine to accelerate and/or frictional breaks to decelerate.

Figure 2:
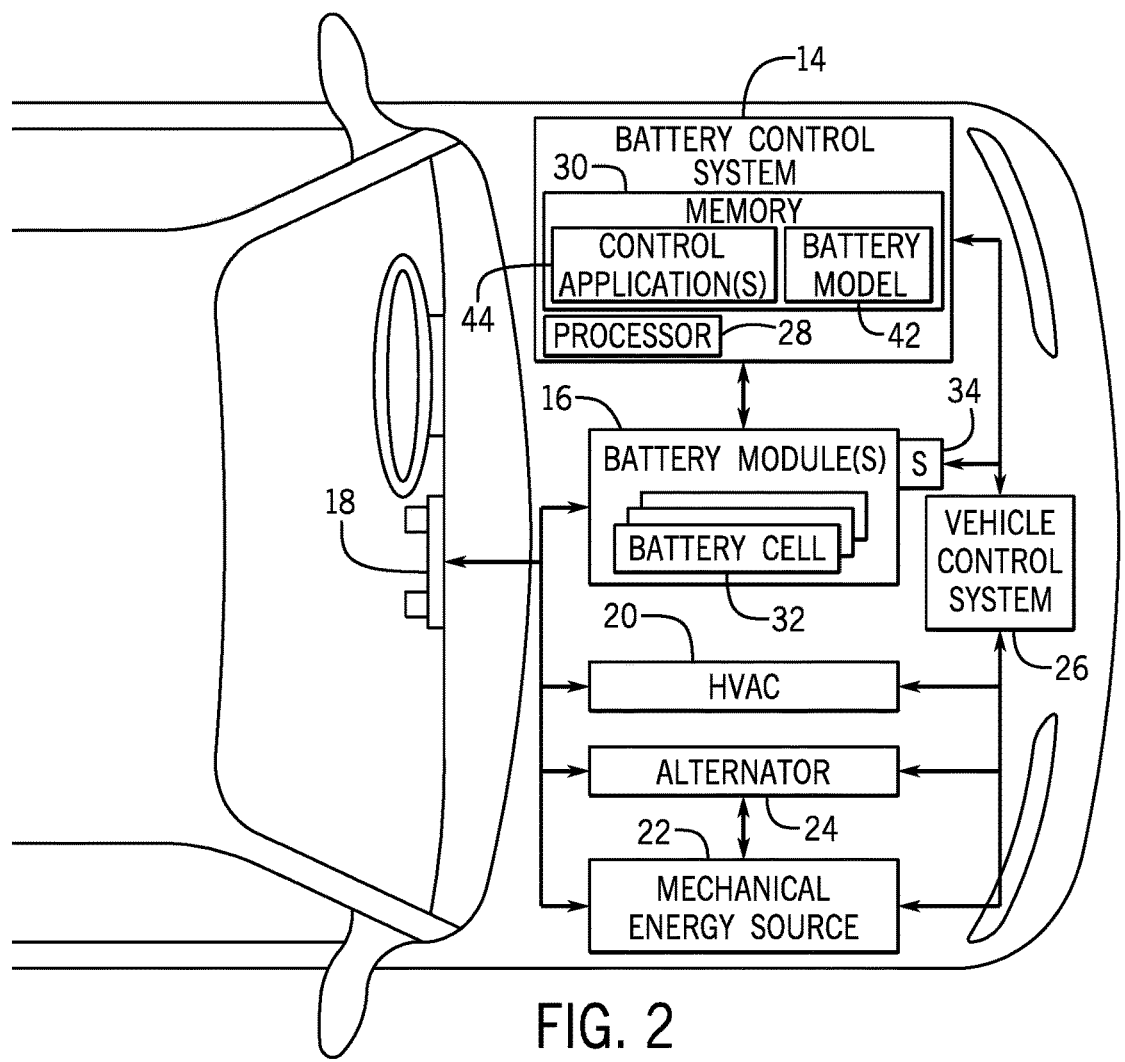
FIG. 2 is a block diagram of the battery system of FIG. 1, in accordance with an embodiment.

A more detailed view of an example automotive electrical system including the battery system 12 is shown in FIG. 2. In the depicted example, the battery system 12 includes a battery control system 14 and one or more battery modules 16. Additionally, the automotive electrical system may include a vehicle console 18 and a heating, ventilating, and air conditioning (HVAC) system 20. In some embodiments, the automotive electrical system may additionally or alternatively include a mechanical energy source 22 (e.g., an electric motor) operating in a motor mode.

Additionally, in the depicted automotive vehicle 10, the automotive electrical system may include an electrical source. In the illustrated example, the electrical source in the automotive electrical system is an alternator 24. The alternator 24 may convert mechanical energy generated by the mechanical energy source 22 (e.g., an internal combustion engine and/or rotating wheels) into electrical energy. In some embodiments, the electrical source may additionally or alternatively include the mechanical energy source 22 (e.g., an electric motor) operating in a generator mode.

As depicted, the automotive vehicle 10 includes a vehicle control system 26. In some embodiments, the vehicle control system 26 may generally control operation of the automotive vehicle 10 including the electrical system. Thus, in the depicted automotive vehicle 10, the vehicle control system 26 may supervise the battery control system 14, the battery module 16, the HVAC 20, the alternator 24, the vehicle console 18, and/or the mechanical energy source 22, making the vehicle control system 26 similar to a supervisory control system. However, the vehicle control system 26 may additionally control operation of other components other than the components of the electrical system, such as an internal combustion engine propulsion system.

In some embodiments, the battery control system 14 may additionally or alternatively control operation of the battery system 12. For example, the battery control system 14 may determine operational parameters of battery modules 16, coordinate operation of multiple battery modules 16, communicate control commands (e.g., signal) instructing the battery system 12 to perform control actions, and/or communicate with the vehicle control system 26.

To facilitate controlling operation of the battery system 12, the battery control system 14 may include a processor 28 and memory 30. In some embodiments, the memory 30 may include a tangible, non-transitory, computer readable medium that stores data, such as instructions executable by the processor 28, results (e.g., battery states) determined by the processor 28, and/or information (e.g., operational parameters) to be analyzed/processed by the processor 28. Thus, in such embodiments, the memory 30 may include random access memory (RAM), read only memory (ROM), rewritable non-volatile memory (e.g., flash memory), hard drives, optical discs, and the like. Additionally, the processor 28 may include one or more general purpose processing units, processing circuitry, and/or logic circuitry. For example, the processor 28 may include one or more microprocessors, one or more application-specific integrated circuits (ASICs), and/or one or more field programmable logic arrays (FPGAs).

Additionally, to facilitate the storing and supplying of electrical power, the battery system 12 may include one or more battery modules 16. In some embodiments, storage capacity of the battery system 12 may be based at least in part on number of battery modules 16. Additionally, in some embodiments, operational compatibility of the battery system 12 with the automotive electrical system may be based at least in part on configuration of the battery modules 16, for example, in series and/or in parallel to operate in a target voltage domain. According, in some embodiments, implementation (e.g., number and/or configuration) of the battery modules 16 and, thus, the battery system 12 may vary based at least in part on configuration and/or target application of the automotive electrical system.

As described above, the number and/or configuration of battery modules 16 of the battery system 12 may vary based at least in part on target application. For example, in the depicted automotive vehicle 10, the battery system 12 includes the battery module 16. In some embodiments, the battery module 16 may include one or more battery cells 32 connected in series and/or parallel with terminals of the battery module 16.

Additionally, in some embodiments, the battery system 12 may include multiple battery modules 16 to facilitate improving application flexibility and/or application ease. For example, the battery system 12 may include a first battery module 16 and a second battery module 16, which each includes one or more battery cells 32, connected in series and/or in parallel. It is noted that the battery system 12 may include multiple battery modules 16 to facilitate operational compatibility with multiple voltage domains. For example, the first battery module 16 may operate (e.g., receive and/or supply) using electrical power in a first (e.g., high or 48 volt) voltage domain while the second battery module 16 operates using electrical power in a second (e.g., low or 12 volt) voltage domain.

In any case, the battery control system 14 may be communicatively coupled to one or more sensors 34 to facilitate monitoring operation of a battery module 16 or the battery system 12 as a whole. In particular, a sensor 34 may transmit sensor data to the battery control system 14 indicative of real-time (e.g., measured) operational parameters of the battery modules 16. Thus, in some embodiments, the battery control system 14 may be communicatively coupled to one or more voltage sensors 34, one or more temperature sensors 34, and/or a variety of additional or alternative sensors 34. For example, in the depicted embodiment, the battery control system 14 may receive sensor data from the sensor 34 indicative of the voltage (e.g., terminal voltage) of the battery module 16 and/or current flow through the battery module 16.

In some embodiments, the battery control system 14 may process the sensor data based on instructions stored in memory 30. For example, the battery control system 14 may store a battery model 42 and a control application 44 as instructions in memory 30. As discussed above, the battery control system 14 may execute the control application 44 to determine the state of a battery (e.g., battery module 16 and/or battery cell 32) in the battery system 12. For example, the battery control system 14 may execute a state-of-function control application 44 to determine a discharge current limit and/or a charge current limit based at least in part on terminal voltage of the battery. Additionally, based at least in part on the battery state, the battery control system 14 may instruct the battery system 12 to perform one or more control actions and/or operate in different manners. For example, the battery control system 14 may instruct a switching device to switch from a closed (e.g., connected) position to an open (e.g., disconnected position) when discharge current flowing through the switching device exceeds a discharge current limit stored in memory 30.

Additionally, in some embodiments, the battery control system 14 may use the battery model 42 to predict operation of the battery and/or the battery system 12. In other words, battery models 42 may model behavior of the battery system 12, behavior of one or more battery cells 32, and/or behavior of one or more the battery modules 16. Accordingly, in some embodiments, the memory 30 may store one or more different battery models 42, for example, to model operation at different levels of abstraction and/or to model operation of batteries utilizing different battery chemistries. In any case, to facilitate providing real-time control, a battery model 42 may generally be computationally facile while having a high degree of predictive accuracy.

Generally, the battery control system 14 may use the battery model 42 to predict operational parameters of the battery in addition or as an alternative to operational parameters measured by the sensors 34. In particular, the battery control system 14 may input one or more operational parameter to the battery model 42 and, based at least in part on operational parameter interrelationships, the battery model 42 may output one or more predicted operational parameters. For example, the battery control system 14 may determine terminal voltage of a battery from a sensor 34 and, using the terminal voltage in the battery model 42, the battery control system 14 may determine open-circuit voltage 60 of the battery. In this manner, the battery control system 14 may utilize the battery model 42 to determine (e.g., predict) behavior of the battery, which at least in some instances may facilitate reducing implementation associated cost of the battery system 12, for example, by enabling number of sensors 34 to be reduced.

Figure 3:
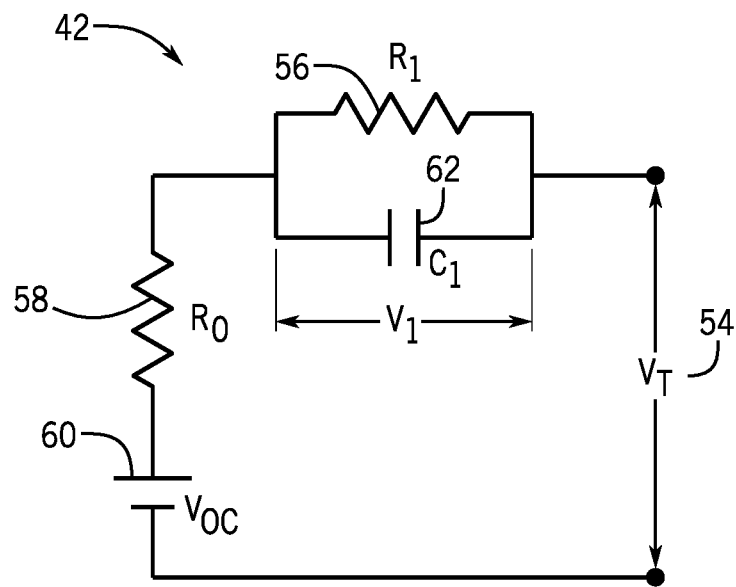
FIG. 3 is a circuit diagram of a battery model used by the battery system of FIG. 1, in accordance with an embodiment.

An example of a battery model 42, which may be used by a battery control system 14 to model operation of a battery, is shown in FIG. 3. As depicted, the battery model 42 utilizes an RC equivalent circuit model. In this way, the battery model 42 may represent one or more of individual battery cells 32 and/or one or more of battery modules 16. The battery model 42 relates the model parameters (e.g., a resistance 56, a resistance 58, and a capacitance 62) to the operational parameters (e.g., terminal voltage 54, terminal current, and battery temperature) measured by one or more sensor 34. Additionally, the battery model 42 may provide a mechanism to estimate the parameters of the battery model 42 (e.g., open-circuit voltage 60) in real-time during operation of the automotive vehicle 10.

In the battery model 42, the resistance 58 (e.g., $R_O$) may represent an ohmic resistance of a current path of the battery module 16, the resistance 56 (e.g., $R_1$) may represent a charge transfer resistance of the battery module 16, and the capacitance 62 (e.g., $C_1$) may represent a double layer capacitance of the battery module 16. In the battery model 42, the resistances 56 and 58 and the capacitance 62 may generally time invariant parameters of the battery module 16. Additionally, the open-circuit voltage 60, used to determine the state of the battery module 16, may generally be a time variant parameter. That is, as the battery module 16 is charged and discharged over a time, the open-circuit voltage 60 may increase and decrease over the time. In this way, the accuracy of the battery model 42, and subsequently the open-circuit voltage 60 parameter, may increase through validation of the model parameters due to the dependence of the value of the parameters upon the model parameters. In any case, as described above, a battery control system 14 may facilitate controlling operation of a corresponding battery system 12 based at least in part on the battery model 42 and/or one or more control applications 44.

Figure 4:
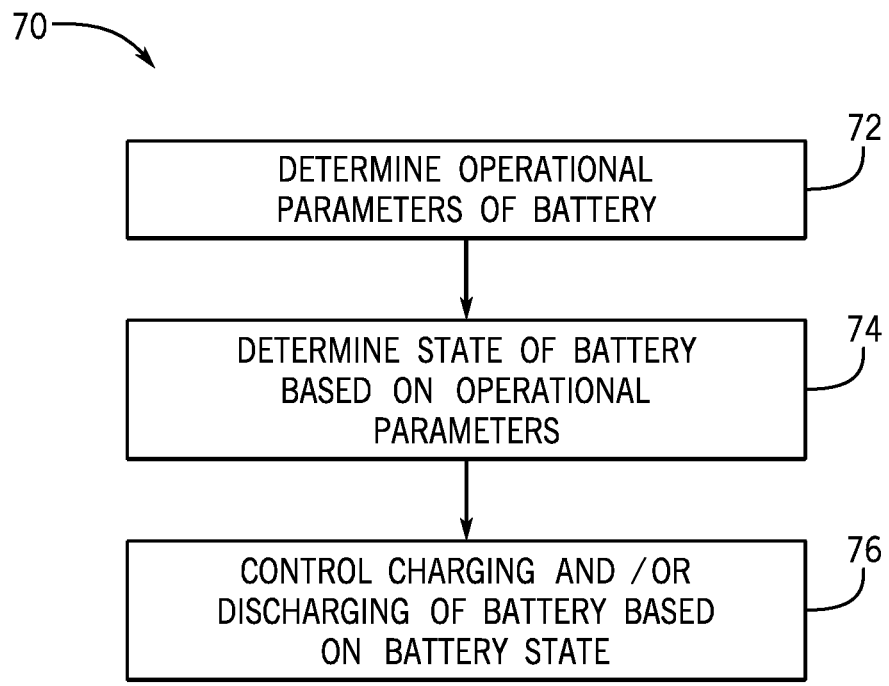
FIG. 4 is a flow diagram of a process for operating the battery system of FIG. 1, in accordance with an embodiment.

To help illustrate, an example of a process 70 for controlling operation of a battery system 12 is shown in FIG. 4. Generally, the process 70 includes determining operational parameters of a battery (process block 72), determining state of the battery based on the operational parameters (process block 74), and controlling charging and/or discharging of the battery based on the battery state (process block 76). In some embodiments, the process 70 may be implemented at least in part by executing instructions stored in a tangible, non-transitory, computer-readable medium, such the memory 30, using processing circuitry, such as the processor 28.

Figure 5:
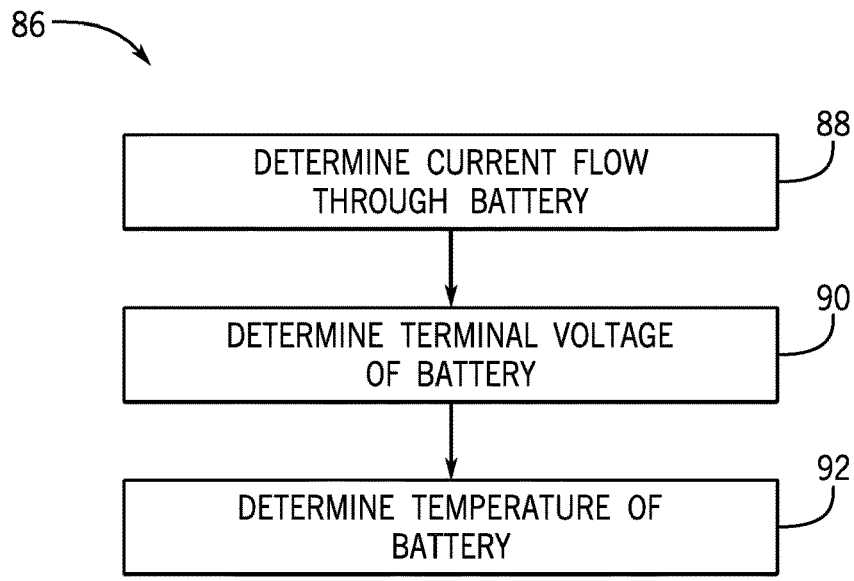
FIG. 5 is a flow diagram of a process for determining operational parameters of a battery in the battery system of FIG. 1, in accordance with an embodiment.

Thus, in some embodiments, the battery control system 14 may determine the operational parameters of the battery (process block 72). An example of a process 86 for determining operational parameters of a battery is described in FIG. 5. Generally, the process 86 includes determining current flow through a battery (process block 88), determining terminal voltage of the battery (process block 90), and determining temperature of the battery (process block 92). In some embodiments, the process 86 may be implemented at least in part by executing instructions stored in a tangible, non-transitory, computer-readable medium, such the memory 30, using processing circuitry, such as the processor 28.

Thus, in some embodiments, a battery control system 14 may determine operational parameters of a battery based at least in part on sensor data (e.g., signals) received from one or more sensors 34. For example, the battery control system 14 may determine terminal voltage 54 of the battery based at least in part on sensor data received from a first (e.g., voltage) sensor 34 (process block 88). Additionally, the battery control system 14 may determine current flow through the battery based at least in part on sensor data received from a second (e.g., current) sensor 34 (process block 90). Furthermore, the battery control system 14 may determine temperature of the battery based at least in part on sensor data received from a third (e.g., temperature) sensor 34 (process block 92).

In this manner, the battery control system 14 may determine operational parameters including terminal voltage, current, and/or temperature of a battery. As described above, different battery models 42 may be utilized to model operation of different batteries. At least in some instances, the operational parameters utilized in different battery models 42 may vary. For example, one battery model 42 may utilize a first set of operational parameters while a different battery model 42 may utilize a second set of operational parameters.

Thus, in some embodiments, the battery control system 14 may vary determined operational parameters based at least in part on operational parameters expected to be utilized in a battery model 42 and/or operational parameters expected to be utilized in a control application 44. For example, when the battery control system 14 uses the battery model 42 described in FIG. 3, determination of the terminal voltage and current may be sufficient. However, in some embodiments, the battery control system 14 may nevertheless determine temperature of the battery since execution of the control application 44 may be dependent on battery temperature.

Figure 6:
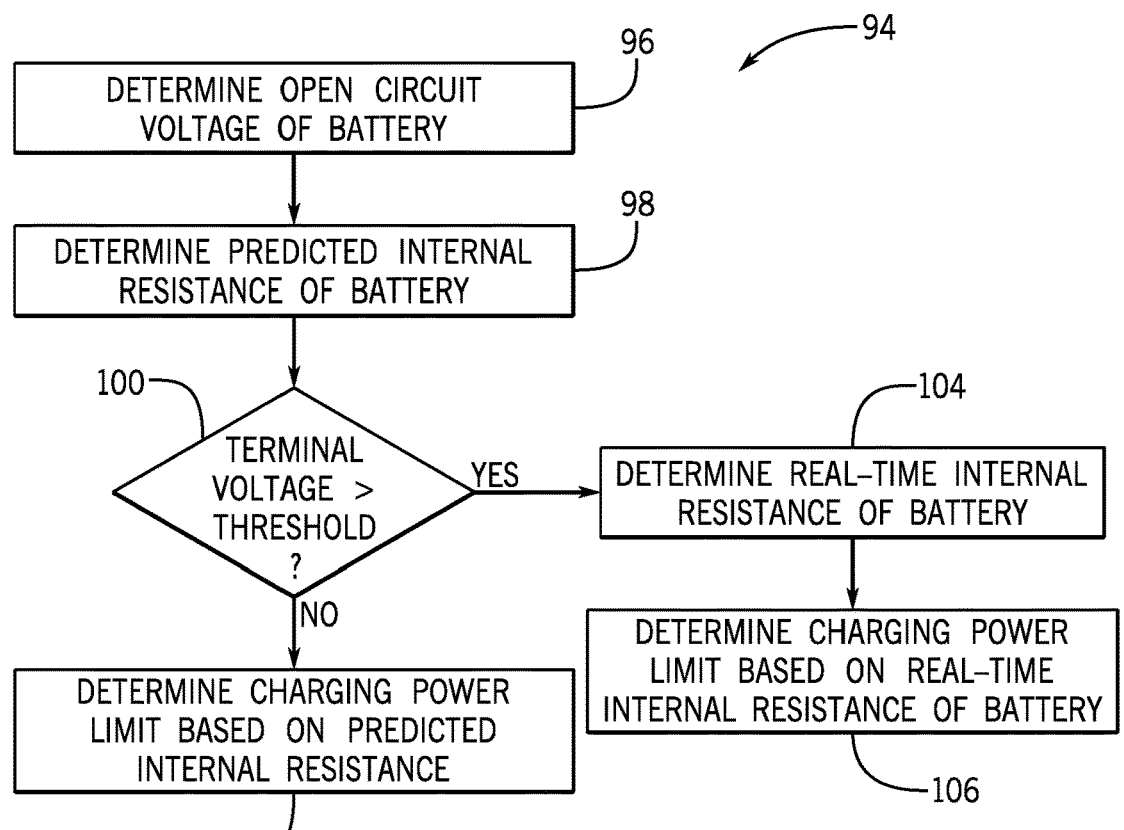
FIG. 6 is a flow diagram of a process for determining state of the battery in the battery system of FIG. 1, in accordance with an embodiment.

Returning to the process 70 of FIG. 4, based at least in part on the operational parameters of the battery, the battery control system 14 may determine state of the battery (process block 74). An example of a process 94 for determining one or more battery states is described in FIG. 6. Generally, the process 94 includes determining open-circuit voltage of a battery (process block 96), determining predicted internal resistance of the battery (process block 98), determining whether terminal voltage of the battery is greater than a voltage threshold (decision block 100), and determining a charging power limit based on the predicted internal resistance when the terminal voltage is not greater than the voltage threshold (process block 102). When the terminal voltage is greater than the voltage threshold, the process 94 includes determining real-time internal resistance of the battery (process block 104) and determining the charging power limit based on the real-time internal resistance of the battery (process block 106). In some embodiments, the process 94 may be implemented at least in part by executing instructions stored in a tangible, non-transitory, computer-readable medium, such the memory 30, using processing circuitry, such as the processor 28.

Thus, in some embodiments, a battery control system 14 may determine (e.g., predict or estimate) open-circuit voltage 60 of a battery based at least in part on operational parameters of the battery (process block 96). Generally, open-circuit voltage 60 of a battery may vary with its state-of charge. Thus, in some embodiments, the battery control system 14 may execute a state-of-charge control application 44 to facilitate determining the open-circuit voltage 60. For example, by executing the state-of-charge control application 44, the battery control system 14 may determine state-of-charge based at least in part on previous current flow through the battery (e.g., using a coulomb counting technique). Leveraging their inter-relationship, the battery control system 14 may then determine open-circuit voltage 60 of the battery based at least in part on its state-of-charge.

Additionally, the battery control system 14 may determine a predicted internal resistance of the battery (process block 98). In some embodiments, the battery control system 14 predict internal resistance expected to occur based on projected operational conditions (state-of-charge, temperature, power usage, etc.). For example, the battery control system 14 may determine the predicted internal resistance based at least in part on a predicted driving pattern, current flow through the battery, and terminal voltage 54 of the battery. In such embodiments, the predicted internal resistance may be determined using the following relationship (e.g., model):

$$R = \frac{\Delta V}{|I|} \quad (1)$$

where R is the predicted internal resistance, $\Delta V$ is the difference between the present (e.g., real-time) terminal voltage and estimated open-circuit voltage, I is the value of the present battery current. In this manner, the predicted battery resistance may determine the predicted battery internal resistance of the battery with appropriate consideration of charging and/or discharging over a time.

When terminal voltage 54 of the battery is greater than a voltage threshold, the battery control system 14 may determine a real-time internal resistance of the battery (process block 104). In some embodiments, the voltage threshold may be predetermined and stored in a tangible, non-transitory, computer-readable medium, such as memory 30. Thus, in such embodiments, battery control system 14 may retrieve the voltage threshold from the tangible, non-transitory medium for comparison with the terminal voltage 54.

Additionally, as described above, lifespan of a battery may be reduced when its terminal voltage is increased above an upper voltage threshold. To reduce likelihood of sensor or measurement error resulting in actual terminal voltage exceeding the upper voltage threshold, in some embodiments, a battery may begin to be de-rated before its measured terminal voltage 54 reaches the upper voltage threshold, for example, by limiting charging and/or discharging of the battery. For example, the battery control system 14 may de-rate the battery based at least in part on a comparison between its measured terminal voltage 54 and a lower voltage threshold.

Thus, when the measured terminal voltage is greater than the lower voltage threshold, the battery control system 14 may determine real-time internal resistance of the battery based at least in part on a battery model 42. For example, using the battery model 42 shown in FIG. 4, the battery control system 14 may determine the real-time internal resistance (e.g., combined resistance of resistance 58, resistance 56, and/or capacitance 62) of the battery based at least in part on its open-circuit voltage 60, measured (e.g., present or real-time) terminal voltage 54, and measured (e.g., present or real-time) battery current. In particular, the real-time internal resistance may be equal to difference between the measured terminal voltage 54 and the open-circuit voltage 60 divided by the measure battery current.

Based at least in part on the real-time internal resistance or the predicted internal resistance, the battery control system 14 may determine a charging power limit. Generally, varying charging power supplied to a battery may present varying tradeoffs. For example, increasing charging power may increase electrical energy stored in the battery, but also increase temperature of the battery, which may result in a decrease in its lifespan. On the other hand, reducing charging power (e.g., de-rating) may facilitate decreasing temperature of the battery, but may also reduce electrical energy stored in the battery. Thus, to facilitate balancing the various tradeoffs, the battery control system 14 may execute an (e.g., state-of-function) control application 44 to determine a charging power limit.

In particular, when the measured terminal voltage 54 is greater than the lower voltage threshold, the battery control system 14 may execute the control application 44 using the real-time internal resistance to determine the charging power limit for the battery (process block 106). As described above, since internal resistance is generally dynamic (e.g., varies with time), the real-time internal resistance may more accurately represent the actual internal resistance at a specific instance in time, for example, compared to the predicted internal resistance. In other words, at least in some instances, determining the charging power limit in this manner may facilitate achieving a target balance between the various tradeoffs, for example, by reducing likelihood of rapid terminal voltage oscillations.

On the other hand, when terminal voltage 54 of the battery is not greater than the lower voltage threshold, the battery control system 14 may execute the control application 44 using the predicted internal resistance to determine the charging power limit for the battery (process block 102). As described above, the predicted internal resistance may be predicted over a prediction horizon and, thus, be applicable for more than one specific instance in time. In fact, while a real-time internal resistance may more accurately represent internal resistance at a specific instance in time, accuracy of the predicted internal resistance may generally be sufficient to determine charging power limits during its prediction horizon. Thus, by utilizing the terminal voltage as in indicator of division between such instances, determining charging power limits in this manner may facilitate improving processing efficiency of a battery control system 14, for example, by reducing number of times real-time internal resistance is determined.

Figure 7:
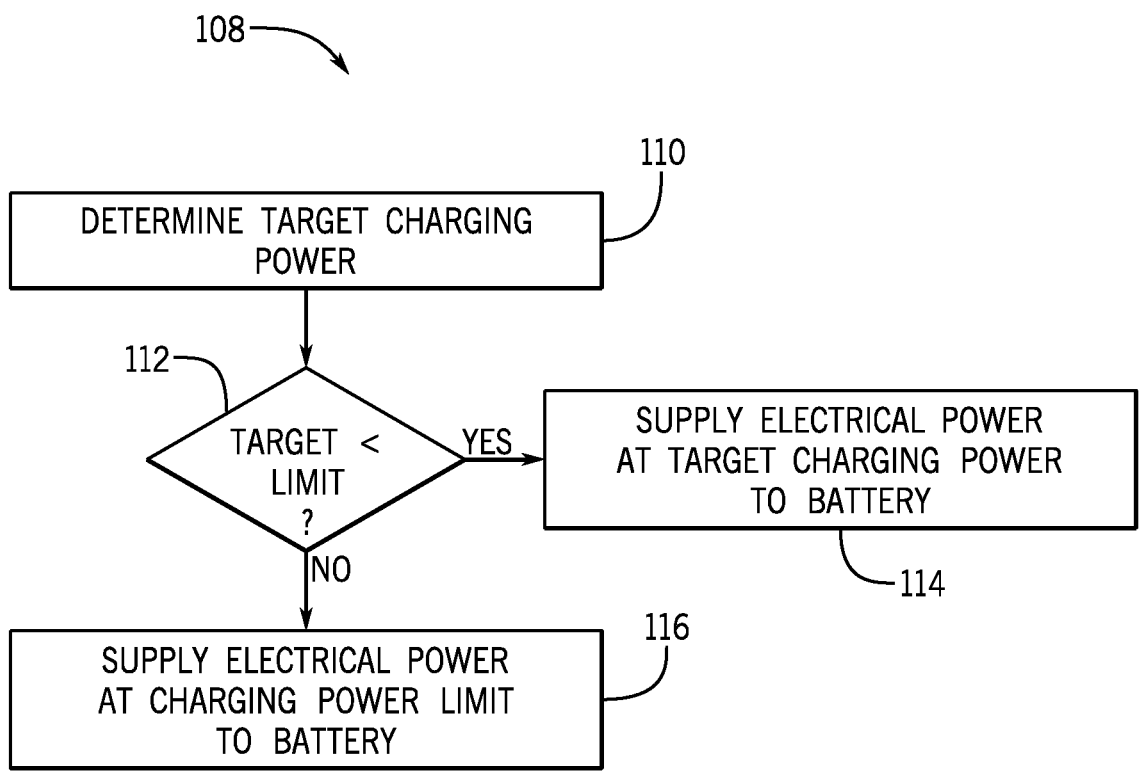
FIG. 7 is a flow diagram of a process for controlling charging of the battery in the battery system of FIG. 1, in accordance with an embodiment.

Returning to the process 70 of FIG. 4, based at least in part on its state, the battery control system 14 facilitates controlling charging and/or discharging of the battery, for example, in coordination with a higher-level (e.g., vehicle) control system (process block 76). To help illustrate, an example of a process 108 for controlling charging of a battery is described in FIG. 7. Generally, the process 108 includes determining a target charging power (process block 110), determining whether the target charging power is less than a charging power limit (decision block 112), supplying electrical power at the target charging power when the target charging power is less than the charging power limit (process block 114), and supplying electrical power at the charging power limit when the target charging power is not less than the charging power limit (process block 116). In some embodiments, the process 108 may be implemented at least in part by executing instructions stored in a tangible, non-transitory, computer-readable medium, such the memory 30, using processing circuitry, such as the processor 28.

Thus, in some embodiments, a control system (e.g., battery control system 14 and vehicle control system 26) may determine a target charging power (process block 110). As described above, varying charging power may affect amount of electrical energy stored in a battery and, thus, subsequent ability of the battery to supply electrical power to electrical devices. Thus, in some embodiments, the battery control system 14 may determine the target charging power based at least in part on target state-of-charge to be achieved by a charging operation. Additionally or alternatively, the battery control system 14 may determine the target charging power based at least in part on the electrical devices to which the battery is expected to subsequently supply electrical power.

Based on a comparison between the target charging power and the charging power limit, the control system may instruct an electrical power source (e.g., alternator or generator) to adjust electrical power supplied to the battery. In particular, when the target charging power is less than the charging power limit, the control system may instruct the electrical power source to supply electrical power to the battery in accordance with the target charging power. On the other hand, when the target charging power is not less than the charging power limit, the control system may instruct the electrical power source to supply electrical power to the battery in accordance with the charging power limit to facilitate improving operational reliability of the battery, for example, by reducing likelihood of the charge operation significantly affecting (e.g., shortening) subsequent lifespan of the battery.

Thus, one or more of the disclosed embodiments, alone or on combination, may provide one or more technical effects including improving performance of a battery system. In particular, the disclosed embodiments may determine power limit for charging and/or discharging a battery by executing control applications, for example, based on voltage, current, temperature, state-of-charge, battery cell and operational parameters. For instance, a battery control system may estimate power limits that are used when outputting control commands (e.g. switching an electrical generator from closed position to an open position) by using prediction of battery states based at least in part on operational parameters determined by a battery model. Additionally or alternatively, a the battery control system may determine real-time (e.g., measured or actual) operational parameters of the battery system based at least in part on sensor data received from one or more sensors. In this manner, the techniques described herein enable improving accuracy of online (e.g. real-time or near real-time) battery state determination. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An automotive electrical system comprising a battery system, wherein the battery system comprises:
a battery comprising terminals configured to be electrically coupled to a one or more electrical devices in the automotive electrical system;
one or more sensors electrically coupled to the terminals of the battery, wherein the one or more sensors are configured to determine sensor data indicative of a measured terminal voltage of the battery; and
a battery control system communicatively coupled to the one or more sensors, wherein the battery control system is programmed to:
determine a predicted internal resistance of the battery, wherein the predicted internal resistance is determined based on operational conditions projected over a prediction horizon;
determine a charging power limit used to control supply of electrical power to the battery based at least in part on the predicted internal resistance when the measured terminal voltage of the battery is not greater than a lower voltage threshold; and
when the measured terminal voltage of the battery is greater than the lower voltage threshold:
determine a real-time internal resistance of the battery based at least in part the measured terminal voltage of the battery and a battery model that describes relationship between measured battery parameters and internal resistance of the battery; and
determine the charging power limit based at least in part on the real-time internal resistance to facilitate improving operational reliability of the battery.

2. The automotive electrical system of claim 1, comprising:
an electrical power source electrically coupled to the terminals of the battery; and
a vehicle control system communicatively coupled to the battery control system and the electrical power source, wherein the vehicle control system is programmed to:
receive an indication of the charging power limit from the battery control system; and
instruct the electrical power source to supply electrical power to the battery in accordance with the charging power limit.

3. The automotive electrical system of claim 1, wherein the battery control system is programmed to:
determine the real-time internal resistance corresponding with a instance in time during the prediction horizon;
control charging of the battery at the instance in time using the charging power limit determined based at least in part on the predicted internal resistance when the measured terminal voltage of the battery is not greater than a lower voltage threshold; and
control charging of the battery at the instances in time using the charging power limit determined based at least in part on the real-time internal resistance when the measured terminal voltage of the battery is greater than a lower voltage threshold.

4. The automotive electrical system of claim 1, wherein:
the battery model comprises an RC circuit configured to describe the relationship of the internal resistance to the terminal voltage of the battery, current flow through the battery, and an open-circuit voltage of the battery; and
the internal resistance in the RC circuit comprises:
a first resistor electrically coupled in series between the open-circuit voltage and the terminal voltage of the battery; and
a second resistor and a capacitor electrically coupled in parallel between the open-circuit and the terminal voltage of the battery.

5. The automotive electrical system of claim 1, wherein:
the one or more sensors are configured to determine sensor data indicative of a measured current flow through the battery; and
to determine the real-time internal resistance, the battery control system is programmed to:
determine open-circuit voltage of the battery; and
determine the real-time internal resistance of the battery based at least in part on difference between the measured terminal voltage of the battery and the open-circuit of the battery divided by the measured current flow through the battery.

6. The automotive electrical system of claim 5, wherein, to determine the open-circuit voltage of the battery, the battery control system is programmed to:
determine an initial state-of-charge of the battery;
determine a current state-of-charge of the battery based at least in part on current flow through the battery between the initial state-of-charge and the current state-of-charge; and
determine the open-circuit voltage of the battery based at least in part on the current state-of charge of the battery.

7. The automotive electrical system of claim 5, wherein, to determine the open-circuit voltage of the battery, the battery control system is programmed to:
instruct the battery system to electrically disconnect the battery from the one or more electrical devices; and
determine the open-circuit voltage of the battery based at least in part on the measured terminal voltage after the battery is maintained electrically disconnected from the one or more electrical devices a duration greater than a rest duration threshold.

8. The automotive electrical system of claim 1, wherein:
the one or more sensors are configured to determine sensor data indicative of measured current flow through the battery; and
to determine the predicted internal resistance, the battery control system is programmed to:
determine a predicted driving pattern, wherein the predicted driving pattern comprises projected battery states over the prediction horizon;
determine a voltage change between the measured terminal voltage relative to a previous terminal voltage of the battery; and
determine the predicted internal resistance based at least in part on the voltage change multiplied by the measured current flow through the battery and divided by the predicted driving pattern.

9. The automotive electrical system of claim 1, comprising a temperature sensor configured to determine sensor data indicative of temperature of the battery, wherein the battery control system is programmed to adjust model parameters of the battery model based at least in part on the temperature of the battery.

10. The automotive electrical system of claim 1, wherein the battery control system is programmed to instruct the battery system to electrically disconnect the battery from the one or more electrical devices when the measured terminal voltage of the battery exceeds an upper voltage threshold greater than the lower voltage threshold to facilitate improving lifespan of the battery.

11. The automotive electrical system of claim 1, wherein the battery comprises:

a lithium-ion battery cell electrically coupled between the terminals; or a lithium-ion battery module comprising a plurality of battery cells electrically coupled between the terminals.

12. A method for controlling charging of a battery cell in an automotive vehicle, comprising:

determining, using a control system, measured terminal voltage of the battery cell based at least in part on sensor data received from a first sensor;

determining, using the control system, a predicted internal resistance of the battery cell, wherein the predicted internal resistance comprises based on projected operational conditions projected over a prediction horizon;

determining, using the control system, a charging power limit by:

determining the charging power limit based at least in part on the predicted internal resistance of the battery cell when the measured terminal voltage of the battery cell is not greater than a lower voltage threshold; and determining the charging power limit based at least in part on a real-time internal resistance of the battery cell when the measured terminal voltage of the battery cell is greater than the lower voltage threshold, wherein the real-time internal resistance of the battery cell is determined based at least in part on a battery model that relates measured operational parameters to model parameters comprising internal resistance; and instructing, using the control system, an electrical power source to adjust charging power supplied to the battery cell based at least in part on the charging power limit when a target charging power is greater than the charging power limit.

13. The method of claim 12, wherein determining the predicted internal resistance comprises:

determining a predicted driving pattern of the automotive vehicle, wherein the predicted driving pattern comprises battery states projected over the prediction horizon;

determining a voltage change of the measured terminal voltage relative to a previous terminal voltage of the battery cell; and determining the predicted internal resistance based at least in part on the voltage change multiplied by the measured current flow through the lithium-ion battery module and divided by the predicted driving pattern.

14. The method of claim 12, comprising:

determining, using the control system, measured current flow through the battery cell based at least in part on sensor data received from a second sensor; and determining, using the control system, the real-time internal resistance of the battery cell when the measured terminal voltage of the battery cell is greater than the lower voltage threshold by:

determining open-circuit voltage of the battery cell; and determining the real-time internal resistance of the battery cell based at least in part on difference between the measured terminal voltage of the battery cell and the open-circuit voltage of the battery cell divided by the measured current flow through the battery cell.

15. The method of claim 14, wherein determining the open-circuit voltage of the battery cell comprises:

determining state-of-charge of the battery cell based at least in part on the measured current flow through the battery cell; and determining the open-circuit voltage of the battery cell based at least in part on the state-of-charge of the battery cell.

16. The method of claim 12, comprising instructing, using the control system, a switching device electrically coupled between the battery cell and the electrical power source to switch to an open position when the measured terminal voltage of the battery cell exceeds an upper voltage threshold greater than the lower voltage threshold.

17. A tangible, non-transitory, computer-readable medium storing instructions executable by one or more processors of an automotive control system, wherein the instructions comprise instructions to:

determine, using the one or more processors, measured terminal voltage of an automotive battery module based at least in part on sensor data received from a first sensor;

determine, using the one or more processors, a predicted internal resistance of the automotive battery module expected to occur over a prediction horizon;

determine, using the one or more processors, a charging current limit by:

determining the charging current limit based at least in part on the predicted internal resistance of the automotive battery module when the measured terminal voltage of the automotive battery module is not greater than a voltage threshold; and determining the charging current limit based at least in part on a real-time internal resistance of the automotive battery module when the measured terminal voltage of the automotive battery module is greater than the voltage threshold, wherein the real-time internal resistance of the automotive battery module is determined based at least in part on a battery model that relates measured battery parameters to model parameters comprising internal resistance; and instruct, using the one or more processors, the automotive battery module to supply electrical power to an electrical device in an automotive vehicle based at least in part on the discharging power limit.

18. The tangible, non-transitory, computer-readable medium of claim 17, comprising instructions to:

determine, using the one or more processor, measured current flow through the automotive battery module based at least in part on sensor data received from a second sensor; and determine, using the one or more processors, the real-time internal resistance of the lithium-ion battery cell when the measured terminal voltage of the automotive battery module is greater than the voltage threshold by:

determining open-circuit voltage of the automotive battery module; and determining the real-time internal resistance of the automotive battery module based at least in part on difference between the measured terminal voltage of the battery cell and the open-circuit voltage of the battery cell divided by the measured current flow through the battery cell.

19. The tangible, non-transitory, computer-readable medium of claim 18, wherein the instructions to determine the open-circuit voltage of the automotive battery module comprise instructions to:

determine state-of-charge of the automotive battery module based at least in part on the measured current flow through the automotive battery module; and determine the open-circuit voltage of the automotive battery module based at least in part on the state-of-charge of the automotive battery module.

20. The tangible, non-transitory, computer-readable medium of claim 17, wherein the instructions to determine the predicted internal resistance comprise instructions to:
- determine a predicted driving pattern of the automotive vehicle, wherein the predicted driving pattern comprises battery state projected over the prediction horizon;
- determine a voltage change of the measured terminal voltage relative to a previous terminal voltage of the automotive battery module; and
- determine the predicted internal resistance based at least in part on the voltage change multiplied by the measured current flow through the automotive battery module and divided by the predicted driving pattern.

* * * * *